United States Patent [19]

Nankee

[11] Patent Number: 4,932,984
[45] Date of Patent: Jun. 12, 1990

[54] PROCESS FOR REDUCTION OF CHLORINATED SOLVENT EMISSIONS

[75] Inventor: Robert J. Nankee, Midland, Mich.

[73] Assignee: The Dow Chemical Company, Midland, Mich.

[21] Appl. No.: 386,834

[22] Filed: Jul. 27, 1989

[51] Int. Cl.$^5$ .............................................. B01D 47/05
[52] U.S. Cl. ......................................... 55/29; 55/71; 55/80
[58] Field of Search ................... 55/29, 71, 80, 89, 82

[56] References Cited

U.S. PATENT DOCUMENTS 3,793,801  2/1974  Tsao ........................................ 55/71
3,810,346  5/1974  Uratani ................................... 55/29

Primary Examiner—Charles Hart
Attorney, Agent, or Firm—Paula Sanders Ruhr

[57] ABSTRACT

Chlorinated solvents are removed from vapor vent streams containing the solvent, water and non-condensable vapors by contacting the vent stream with a liquid spray of precooled chlorinated solvent at a temperature less than the freezing point of water. The solid ice floats on the liquid chlorinated solvent and can be readily separated therefrom.

10 Claims, 1 Drawing Sheet

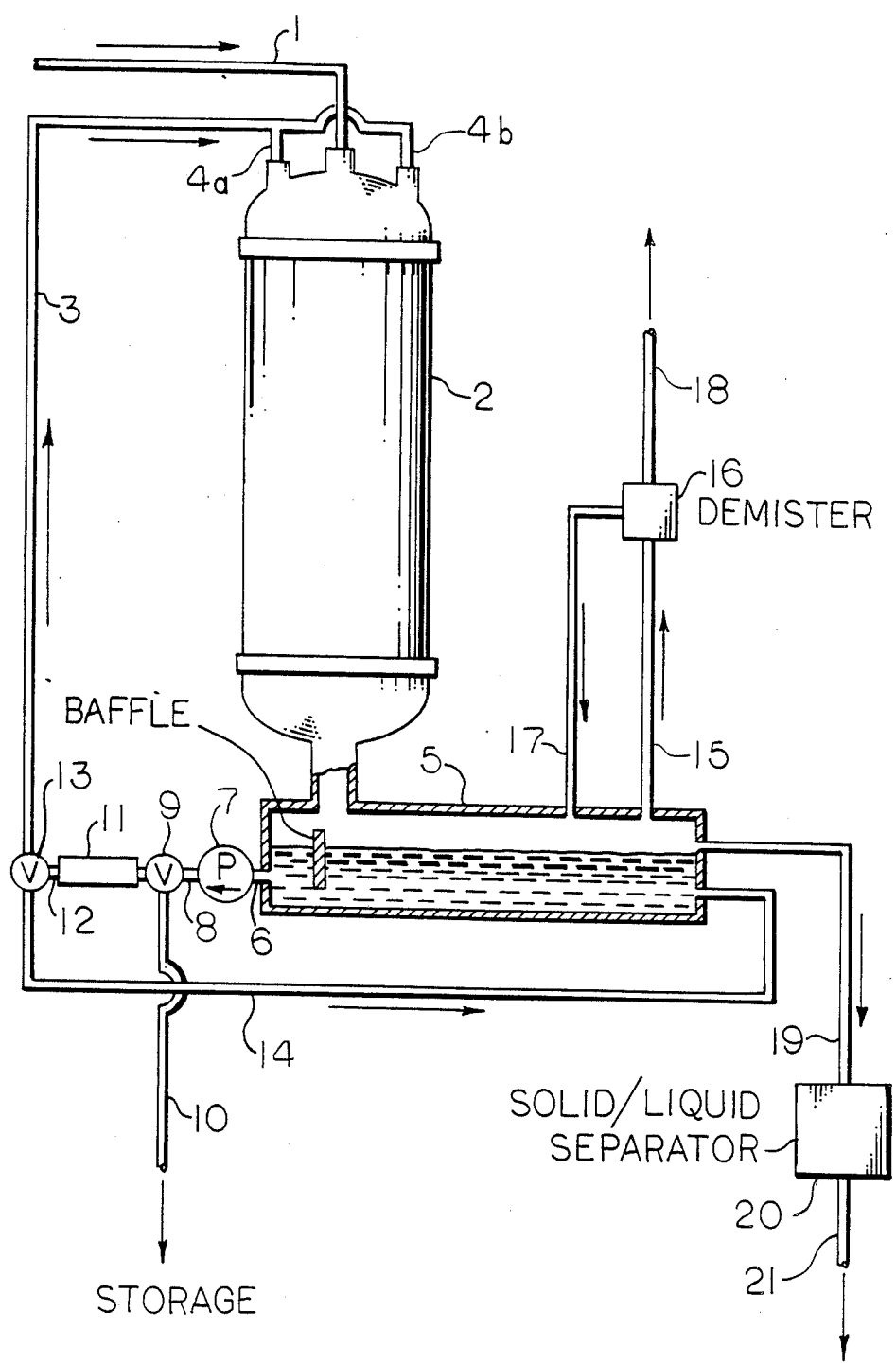

PROCESS FOR REDUCTION OF CHLORINATED SOLVENT EMISSIONS

BACKGROUND OF THE INVENTION

The present invention is related to processes for the removal of chlorinated solvent vapors from vent streams containing the solvent, non-condensable vapors and water.

Various industrial chemical processes result in the production of vent streams containing chlorinated solvents. The need to remove these chlorinated solvents from vent streams prior to release into the environment is well recognized. Typically, processes used to remove chlorinated solvents from vapor vent streams include condensing the vapors using shell and tube heat exchangers. When these condensers are operated at temperatures below the freezing point of water, a common problem limiting their effectiveness is the formation of ice on the condenser surfaces. Other methods of removing chlorinated solvents from vent streams include oil scrubbers. Problems with these processes may include contamination between the oil and the chlorinated solvents.

As it becomes desirable to remove higher percentages of the solvents from the vapor streams, more effective means of removing the chlorinated solvents are needed. One method used is a carbon adsorber which is effective, but quite expensive. Thus, efficient, economical methods of removing chlorinated solvents from vent streams containing water are needed.

SUMMARY OF THE INVENTION

The present invention is a process for the removal of chlorinated solvent vapors from a vent stream containing the chlorinated solvent vapor, water vapor and non-condensable vapor comprising (1) contacting the vent stream with a liquid spray of chlorinated solvent under conditions such that the chlorinated solvent vapors present in the vent stream condense onto the liquid chlorinated solvent spray droplets and the water present in the vent stream condenses onto the droplets and freezes, and (2) separating the liquid chlorinated solvent, the solid water and the non-condensable vapor.

DETAILED DESCRIPTION OF THE ILLUSTRATIVE EMBODIMENTS

The vent streams which may be treated by the practice of this invention are those containing a chlorinated solvent, water vapor and non-condensable vapor. Examples of non-condensable vapors which may be included in the vent stream include compounds useful in blanketing reactions such as air, nitrogen and carbon dioxide. Such vent streams may also contain trace amounts of other compounds such as hydrocarbons, alcohols, glycol ethers and glycols. By trace amounts, it is meant that no more than about ten volume percent of various contaminants are present. Non-limiting examples of chlorinated solvents which may be removed from vent streams by the practice of this invention include methylene chloride, chloroform, 1,1,1-trichloroethane, trichloroethylene and perchloroethylene.

The composition of the vent streams which may be treated by the practice of this invention will vary based on the source of the vent stream. Factors limiting the composition of the vent stream include the saturation point of the particular chlorinated solvent and water in air or other blanketing vapor present in the vent stream at the initial temperature of the vent stream and the amount and identity of contaminants present.

The composition of vent streams which may be treated by the practice of this invention ranges from lean in the chlorinated solvent to rich in the chlorinated solvent. Rich concentrations are those near the saturation temperature of the inlet vent stream. The chlorinated solvent present in this type of stream will start to condense as soon as it is reduced in temperature. Lean concentrations are those which are not near the saturation temperature of the inlet vent stream The limitation on the lean concentration is that the concentration of chlorinated solvent is great enough so that it will condense when cooled in the spray chamber so that at least about fifteen percent of the vapor is removed as condensate. It is preferred that the composition of the vent stream is not modified prior to treatment using the process of this invention.

The following description refers to the FIGURE and presents a preferred embodiment of the invention. It will be recognized by one skilled in the art that various modifications may be made within the scope of the invention.

A vent stream containing chlorinated solvent vapor, water vapor and air enters a liquid-vapor contactor, 2, through line 1. Precooled liquid chlorinated solvent from line 3 enters the liquid-vapor contactor, 2, through nozzles 4a and 4b. The droplets of liquid chlorinated solvent fall through the liquid-vapor contactor, 2. The temperature of the precooled chlorinated solvent is such that as the droplets fall, chlorinated solvent vapor condenses onto the droplets while water vapor condenses on the droplets and freezes to form ice. The remainder of vent stream, i.e., air as well as any non-condensed water or chlorinated solvent, also passes through the liquid-vapor contactor, 2. The vapor, liquid chlorinated solvent and frozen water are collected in a sump, 5, located at the bottom of the liquid-vapor contactor, 2. The non-condensable vapors leave the sump, 5, through line 15 to a mist eliminator 16. Here the vapor, primarily air, is separated from any entrained liquid. The liquid is returned to the sump through line 17 and the vapor is removed from the system through line 18. The vapor from line 18 may be vented to the atmosphere or may be subjected to additional treatment. A portion of the liquid chlorinated solvent is taken from the sump, 5, through line 6 to pump 7. The liquid chlorinated solvent is then pumped through line 8 to valve 9 where a portion is taken through line 10 to storage and the remainder is taken to heat exchanger 11. The cooled chlorinated solvent leaves the heat exchanger 11 through line 12 and goes to valve 13 where a portion is recycled through line 14 to maintain a desired level in the sump, 5, and the remainder of the chlorinated solvent, cooled to the temperature needed for the condensing surface, is recycled through line 3 and injected through nozzles 4a and 4b. The floating solids are removed from the sump, 5, through line 19 to a solid/liquid separator 20 where the solid ice and liquid chlorinated solvents are separated from each other. The separated liquid is removed through line 21 where it may be removed for storage, recycled or further treated.

The liquid chlorinated solvent is sprayed into the vapor-liquid contactor chamber using a spraying means that produces droplets having sufficient surface area to act as the condensing surface for the chlorinated solvent vapor and water vapor in the vent stream. It is preferred that the liquid chlorinated solvent is sprayed into the vapor-liquid contactor chamber under conditions such that, at any given time, the surface area of droplets available as condensing surfaces for the condensable vapor in the vent stream is at least about one square foot and no more than about 100 square feet to a cubic foot per minute of total vapors, both condensable and non-condensable. Factors affecting the amount of droplet surface area available include the velocity of the liquid within the chamber, the amount of surface area reduced due to ice build-up, the amount of liquid chlorinated solvent injected into the chamber, the size of the chamber and the size of the droplets.

In a preferred embodiment, nozzles are used to inject the liquid spray into the vapor-liquid contactor. The velocity range of the liquid is preferably from about 1 to about 25 feet per second. It is preferred that the liquid spray is injected into the vapor-liquid contactor at an angle. The ability to maintain a horizontal velocity component along with the vertical velocity component helps minimize the vertical length requirement of the vapor-liquid contactor. Additionally, maintaining the horizontal velocity component along with the vertical velocity component will minimize the amount of liquid spray required by more fully utilizing the spray present.

The vapor-liquid contactor chamber is a heat exchanger, preferably insulated so that the difference between the temperature of the liquid chlorinated solvent as it is sprayed into the vapor-liquid contactor chamber and its temperature in the sump is no greater than about five degrees Celsius, preferably no greater than about three degrees Celsius. One skilled in the art will recognize that the lower limit on the temperature gradient is a practical, economic limit when both the cost of further insulation and further recycling of the liquid spray are greater than the cost of refrigeration to cool the liquid chlorinated solvent to the necessary temperature. The vapor-liquid contactor chamber can be selected by one skilled in the art depending on the particular vent stream to be treated. In particular, such factors as inlet stream composition, flow rate, temperature and pressure will be considered. Preferably the chamber is a vertical vessel of sufficient size to allow the condensable vent stream vapor to condense onto the droplets of the liquid spray of the chlorinated solvent as the vent stream passes through the contactor.

The process may be configured to permit either co-current flow of the vent stream vapor and liquid chlorinated solvent or countercurrent flow. Co-current flow is preferred for minimizing system pressure drop. Counter-current flow is preferred to maximize condensation.

The liquid spray of the chlorinated solvent is pre-cooled prior to contacting the liquid with the vent stream. The liquid spray is cooled to less than 0° C. and greater than the freezing point of the chlorinated solvent. Preferred temperatures will vary depending on the identify of the chlorinated solvents involved and can be readily selected by one skilled in the art. When methylene chloride is the chlorinated solvent used, it is preferred to cool the liquid spray of chlorinated solvent to lower than about −30° C. It is preferred that the chlorinated solvent is not precooled to temperatures below about −40° C. The process of the present invention will function at temperatures below −40° C., but normally the cost of refrigeration to achieve and maintain such temperatures becomes excessive.

The liquid spray of chlorinated solvent is preferably the same as the chlorinated solvent present in the vent stream as a vapor. This minimizes contamination of the vent stream chlorinated solvent and eliminates the need for a separation of chlorinated solvents. If desired, it is possible to use a liquid chlorinated solvent different than the one contained in the vent stream. An example of when this might be desirable is when the chlorinated solvent being removed from the vent stream has a relatively high freezing point. In this situation, the efficiency of the process may be improved by using a second chlorinated solvent having a lower freezing point as the pre-cooled liquid. The two chlorinated solvents mix in the vapor/liquid contactor thus resulting in a freezing point of the mixture being lower than that of the pure chlorinated solvent to be removed. This permits the use of lower temperatures and, therefore, higher efficiency is obtained.

The non-condensable vapor is preferably treated to remove any entrained liquid. An example of such a treatment is to pass the vapor through a mist eliminator. Any entrained liquid may be recycled and the vapor may be vented to the atmosphere, recycled for additional treatment by the process of the present invention or subjected to additional treatment using a different technique.

The amount of the chlorinated solvent removed from the vent stream by the practice of this invention will vary depending on the identity of the chlorinated solvent to be removed, contaminants present, temperature and pressure and other reaction conditions. In all cases, the amount of chlorinated solvent removed is preferred to be at least about 50 volume percent. When methylene chloride is the chlorinated solvent, the amount removed is more preferably at least about 85 volume percent and most preferably at least about 95 volume percent. In those instances in which it is desirable or necessary to remove amounts of chlorinated solvents from vent streams in excess of 99 volume percent, the process of this invention may be used in conjunction with other processes such as carbon adsorption.

The following example is provided to illustrate the invention and should not be interpreted as limiting it in any way.

EXAMPLE 1

A vent from a shell and tube condensing system operating with a coolant consists of an emission at 30° C. The emission totals 600 cubic feet of vapors per hour. The emission stream is composed of 75.78 pounds per hour of methylene chloride, 1.13 pounds per hour of water and 15.96 pounds per hour air. The stream enters a vapor liquid contacting chamber that is eight feet long and two feet in diameter. In the chamber, the vapor contacts two sprays of 7.5 gallons per minute of methylene chloride liquid precooled to −38.3° C. The liquid spray (15 gallons per minute total), and 74.71 pounds per hour of condensed methylene chloride and 1.12 pounds per hour of condensed and frozen water from the vapor feed are collected below the chamber in a sump. The temperature of the liquid in the sump is about −36.1° C.

The non-condensable vapors pass through the sump and exit the system via a mist eliminator which separates the vapor from any entrained liquid. The volume of the non-condensable vapors is 178 cubic feet per hour. The non-condensable vapor consists of 1.07 pounds per hour of methylene chloride, 0.006 pounds per hour of water vapor and 15.96 pounds per hour of air. The overall removal from this vent feed stream is 98.6 percent for the methylene chloride and 99.5 percent for the water.

What is claimed is:

1. A process for the removal of chlorinated solvent vapors from a vapor vent stream containing chlorinated solvent vapor, water vapor and non-condensable vapor comprising;
   (1) contacting the vapor vent stream with a liquid spray of the chlorinated solvent precooled to a temperature less than 0° C. under conditions such that the chlorinated solvent vapor in the vent stream condense onto droplets in the liquid spray and the water present in the vent stream condenses onto the droplets and freezes, and
   (2) separating the liquid chlorinated solvent, the solid water and the non-condensable vapor.

2. The process of claim 1 wherein the chlorinated solvent is methylene chloride.

3. The process of claim 1 wherein at least about 50 volume percent of the chlorinated solvent is separated from the non-condensable vapor.

4. The process of claim 2 wherein at least about 85 volume percent of the chlorinated solvent is separated from the non-condensable vapor.

5. The process of claim 1 wherein the vapor vent stream and the liquid spray of chlorinated solvent are contacted co-currently.

6. The process of claim 1 wherein the precooled liquid spray of chlorinated solvent is precooled to a temperature of less than about −30° C.

7. The process of claim 6 wherein the precooled liquid spray of chlorinated solvent is precooled to a temperature greater than about −40° C.

8. The process of claim 1 wherein the non-condensable vapor is selected from the group consisting of air, carbon dioxide and nitrogen.

9. The process of claim 8 wherein the non-condensable vapor is air.

10. A process for the removal of chlorinated solvent vapors from a vapor vent stream containing a first chlorinated solvent vapor, water vapor and air comprising:
   (1) contacting the vapor vent stream with a liquid spray of a second chlorinated solvent different from the first chlorinated solvent and having a freezing point lower than that of the first chlorinated solvent, precooled to a temperature less than 0° C. and greater than the freezing point of the mixture of the first and second chlorinated solvents, under conditions such that the chlorinated solvent vapor in the vent stream condenses onto droplets of the liquid spray and the water present in the vent stream condenses onto the droplets and freezes, and
   (2) separating the liquid chlorinated solvents, the solid water and the non-condensable vapor.

* * * * *